(12) United States Patent
Lee et al.

(10) Patent No.: US 6,556,335 B2
(45) Date of Patent: Apr. 29, 2003

(54) OPTICAL SIGNAL PROCESSOR

(75) Inventors: Heng Loong Lee, Colchester (GB); Dimitra Simeonidou, Colchester (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/941,662

(22) Filed: Aug. 30, 2001

(65) Prior Publication Data

US 2002/0024707 A1 Feb. 28, 2002

(30) Foreign Application Priority Data

Aug. 31, 2000 (GB) ................................................ 0021440

(51) Int. Cl.$^7$ .......................... G02B 26/00; H04B 10/08
(52) U.S. Cl. ........................ 359/238; 359/110; 359/140
(58) Field of Search ................................ 359/238, 110, 359/140, 181, 115, 124

(56) References Cited

U.S. PATENT DOCUMENTS 6,025,944 A * 2/2000 Mendez et al. ............. 359/136

FOREIGN PATENT DOCUMENTS

GB 2 272 814 A 5/1994
WO WO 95/07596 3/1995

OTHER PUBLICATIONS

Christian Guillemot et al, "Transparent Optical Packet Switching: The European ACTS KEOPS Project Approach", Journal of Lightwave Technology, vol. 16, No. 12, Dec. 1998, pp. 2117–2131.
David Cotter et al, "Asynchronous Digital Optical Regeneration and Networks", Journal of Lightwave Technology, vol. 16, No. 12, Dec. 1998, pp. 2068–2080.
Yoshiaki Yamada et al, "High–Level Fluctuation Tolerant Optical Receiver for Optical Packet Switch and WDM Cross–Connect", Journal of Lightwave Technology, vol. 16, No. 12, Dec. 1998, pp. 2220–2227.

T. Sangsiri et al, "Bit Synchronization Using Subcarriers for Control Signaling", IEEE Photonics Technology Letters, vol. 11, No. 5, May 1999, pp. 602–604.
Akio Tajima et al, "A 10–Gb/s Optical Asynchronous Packet Receiver with a Fast Bit–Synchronization Circuit", IEICE Trans. Selectron, vol. E82–C, No. 8, Aug. 1999, pp. 1387–1392.
Ken–ichi Kitayama et al, "Photonic IP Routing", IEEE Photonics Technology Letters, vol. 11, No. 12, Dec. 1999, pp. 1689–1691.
A. E. Kelly et al, "80 Gbit/s all–optical regenerative wavelength conversion using semiconductor optical amplifier based interferometer", Electronics, Letters, Aug. 19, 1999, vol. 35, No. 17, pp. 1477–1478.
Allan Kloch et al, "Wavelength Converters", IEICE Trans. Commun., vol. E82–B, No. 8, Aug. 1999 pp. 1209–1220.
OFC 100C (Optical Fiber Communication Conference)— Technical Digest, 'All–optical packet header recognition and switching in a reconfigurable network using fiber Bragg gratings for time–to–wavelength mapping and decoding—M C Cardakli et al—Feb. 21–26, 1999 (conference).
David K .Hunter et al, "WASPNET: A Wavelength Switched Packet Network", IEEE Communications Magazine, Mar. 1999, pp. 120–129.
A. Tzanakaki et al, "Analysis of tunable wavelength converters based on cross–gain modulation in semiconductor optical amplifiers operating in the counter propagating mode", IEE Proc.,—Optoelectron, vol. 147, No. 1, Feb. 2000.

* cited by examiner

Primary Examiner—Huy Mai
Assistant Examiner—Tuyen Tra
(74) Attorney, Agent, or Firm—Sughrue Mion, PLLC (57) ABSTRACT

The present invention provides an optical signal processor for the optical processing of a digitally amplitude-modulated optical signal input thereto, to determine the presence or absence of a predetermined digital bit-pattern within said optical signal.

26 Claims, 6 Drawing Sheets

Bit pattern : 1001

OPTICAL SIGNAL PROCESSOR

The present invention relates to an apparatus and method for optically processing optical signals for the purposes of detecting the presence of a digital bit pattern therein.

In a wide range of applications in optical data transmission it is required to detect a particular digital bit pattern within a high bit-rate optical signal. An example of this is the identification of a packet header in an optically transmitted data packet (e.g. an IP datagram), for subsequent switching or routing of that data packet. Ideally, this identification should be performed optically, that is to say, without recourse to opto-electrical conversion of the packet header.

It is well known that the act of converting an optical packet header into the electrical domain, prior to processing (e.g. routing or switching) of that optical packet, reduces the overall speed of processing. In particular the routing performance of IP routers is degraded when opto-electrical packet header identification is required and results in a transmission bottleneck at the router.

The bottleneck results at least in part from the time required to perform opto-electrical conversion of a given packet header and, as a consequence of this, the header of an optical data packet typically has to be transmitted at a lower bit rate than the payload with which it is associated. The lower bit rate of the header allows more time to be spent in reading the header data opto-electrically, but occupies a relatively large percentage of the optical packet slot thereby lowering bandwidth efficiency.

Clearly, the all-optical identification of optical packet headers would be advantageous in overcoming the aforementioned deficiencies in existing techniques.

One such all-optical technique that has been proposed employs the phase-modulation (binary shift-keying) of the optical carrier wave of a data packet to map digital routing information onto the header of that packet. In particular, the optical carrier wave associated with the header part of an optical data packet is phase-shifted by either 0 degrees or 180 degrees over a number of successive intervals (i.e. a string) of the same fixed duration (e.g. 5 ps). This encodes routing information into the optical header in terms of the pattern of the sequence of carrier phases in the aforementioned string of intervals.

A proposed optical processor is then able to recognize such header information by splitting a received phase-modulated header signal into as many copies as there are intervals in the string it seeks to identify. Each copy is then phase shifted in a predetermined manner and then correlated with every other phase-shifted copy. A correlation peak emerges when the received string (sequence of carrier phases) matches the one that the processor seeks to identify. Thus, by performing optical correlation of the phase-modulated radiation associated with a packet header, the processor may identify a predetermined header and control optical routing of the data packet accordingly. However, implementation of such a technique requires the use of optical phase-modulation in the encoding of header data into a data packet. Optical amplitude-modulation of a packet carrier wave is more typically used to encode not only the header data but also the payload data of most optical data packets in the art. Clearly, the aforementioned optical processor would therefore be unable to process such amplitude-modulated headers. Furthermore, optical phase-modulation tends to be difficult to control and the phase-shifters employed in the proposed optical processor are typically highly sensitive to bit-rate changes in the digital data that phase-modulation is being used to convey. Amplitude modulators tend to be more robust to bit-rate changes, are simple to control and are often cheaper to implement.

Consequently, a need has been identified for an optical signal processor able to recognize the presence of a digitally amplitude-modulated optical signal, in particular an amplitude-modulated optical packet header.

The present invention aims to overcome at least some of the aforementioned deficiencies in the prior art.

According to a first aspect of the present invention there is provided an optical signal processor for the optical processing of a digitally amplitude-modulated optical signal input thereto, to determine the presence or absence of a predetermined digital bit-pattern within said optical signal, the optical signal processor possessing optical processing means including;

signal duplicating means operable to derive from said input digital optical signal one or more duplicate digital optical signals which are each a duplicate of the digital bit-patterns present within the input optical signal;

signal duplicating and inverting means operable to derive from said input digital optical signal one or more polarity-inverted duplicate digital optical signals, the polarity of each bit of which is the inverse of that of the signal bit from which it is derived, wherein;

the optical processing means is operable to derive from said duplicate signals and said polarity-inverted duplicate signals an optical detection signal which indicates the presence or absence of said predetermined amplitude-modulated digital bit-pattern within the input digital signal processed thereby.

Thus, the present invention according to its first aspect provides a means via which digitally amplitude-modulated optical bit-patterns, such as the header of an optical data packet, may be detected within an optical signal without recourse to prior opto-electrical conversion thereof. Clearly, by obviating the need to convert optical signals into equivalent electrical signals prior to signal processing/detection, the present invention enables a substantial reduction in the delay associated with detection of amplitude-modulated optical bit-patterns.

Furthermore, the present invention obviates the need to employ the techniques of optical phase-modulation to optically encode digital data in an attempt to permit detection thereof without opto-electrical conversion. Consequently, the present invention provides an optical processor which aims to overcome at least some of the drawbacks and limitations inherent in employing such phase-modulation.

Preferably, the optical processing means of the present invention according to its first aspect, further includes optical transmission delay means and is operable to transmit through said delay means said duplicate signals and said polarity-inverted duplicate signals derived from said input digital optical signal, wherein;

the optical processing means is operable to derive said optical detection signal from a combination of said duplicate signals and said polarity-inverted duplicate signals output of said optical delay means.

These optical delay means may preferably comprise optical fibre delay lines through which optical signal radiation, derived from the input digital signal, may be transmitted. The delay means may alternatively or additionally include one or more fibre recirculating loops whereby signal radiation is circulated within a fibre loop until sufficient delay has been accumulated whereupon the signal is output of the loop (gated), as is known in the art. Furthermore, the delay means may employ optical memory means (write/read) such as regenerative loop memories.

Furthermore, it is preferable that the signal duplicating means and the signal duplicating and inverting means are operable to produce one or more duplicate signals (polarity-inverted or otherwise) each one of which is conveyed via optical radiation of a wavelength different from that of the radiation conveying any of the other signal duplicates produced thereby. Alternatively, two or more (e.g. all) of the duplicate signals produced by any one (or both) of the signal duplicating means and the signal duplicating and inverting means, may be of the same wavelength.

The optical processing means preferably includes a plurality of separate optical transmission delay means and is operable to transmit respective ones of said duplicate signals and said polarity-inverted duplicate signals through respective individual ones of the separate optical delay means, wherein;

the optical processing means is operable to derive said optical detection signal from a combination of the delayed duplicate signals and delayed polarity-inverted duplicate signals output of said optical delay means.

More preferably, the optical transmission delay provided by each one of said plurality of transmission delay means differs from that provided by any of the other transmission delay means within that plurality by an amount equal to an integer multiple of the optical bit period associated with said predetermined amplitude-modulated digital bit-pattern. More preferably, the delay associated with each individual delay means is unique to that delay means, and preferably the unique delays of successive ones of the delay means successively increase by one said bit period.

Thus, for example, a plurality of respective duplicate optical signals simultaneously input to respective individual ones of the transmission delay means will be subsequently output thereof successively bit-shifted by one bit period.

The optical processing means preferably includes signal routing means operable to direct respective ones of said duplicate signals and said polarity-inverted duplicate signals input thereto to respective individual ones of said separate optical delay means in dependance upon the wavelength of the radiation conveying each respective duplicate signal.

Thus, it will be understood that by using wavelength-dependant optical routing means to uniquely route the one or more duplicate signals (of any polarity) to predefined optical transmission delay means, the present invention permits the transmission delay imposed on each one duplicate signal to be predetermined by initially producing duplicates at the appropriate wavelength. Preferably the transmission delay means imposing this delay includes a plurality of separate optical transmission delay lines the optical transmission delay provided by each one of which is determined by the length thereof.

Optical routing such as this may be achieved using an optical de-multiplexer, and preferably an arrayed waveguide grating de-multiplexer (AWG). Alternatively, the optical signal routing means may comprise one or more wavelength-selective optical splitters/couplers via which said duplicate signals (polarity-inverted or otherwise) may be routed to selected ones of the plurality of transmission delay means, as will be readily apparent to the skilled person.

Alternatively, in embodiments of the present invention where some or all of said duplicate signals (of any polarity) are conveyed via the same wavelength, the optical signal routing means may alternatively or additionally include non-wavelength-selective optical signal routing elements. Such elements may consist of one or more 1-to-N (e.g. "Tree") couplers and/or optical splitters and the like via which some or all of said duplicate signals may be routed to selected ones of the plurality of transmission delay means independently of the wavelength of those signals.

Preferably, the optical processing means includes optical combining means for combining in equal proportion the delayed duplicate and polarity-inverted duplicate signals output from each one of said transmission delay means so as to thereby derive said optical detection signal. Preferably, the delayed signals are simultaneously combined by an optical combiner onto one optical transmission line.

The signal duplicating and inverting means preferably includes a semiconductor optical amplifier (SOA) operable, via the process of Cross-Gain Modulation, to output an optical signal which is the polarity-inverted duplicate of optical signal radiation input thereto. Additionally, the signal duplicating means preferably includes two concatenated semiconductor optical amplifiers (SOA) each operable, via the process of Cross-Gain Modulation, to output an optical signal which is the polarity-inverted duplicate of optical signal radiation input thereto.

The signal processor according to the first aspect of the present invention is preferably operable to partition optical signal radiation input thereto into two portions and to transmit a first such portion via said optical processing means, to a first optical output port thereof and to transmit the second such portion via an optical transmission delay line, to a second optical output of the optical signal processor wherein;

the transmission delay provided by said delay line is such as to permit substantially simultaneous arrival of the optically processed first portion and the delayed second portion at said first and second optical output ports.

Thus, the transmission delay line in question enables the delay associated with optically processing the first portion to be accounted for in the delay imposed upon the second portion.

According to a second aspect of the present invention, there is provided a method for the optical processing of a digitally amplitude-modulated optical signal so as to determine the presence or absence of a predetermined digital bit-pattern therein, the optical signal processing method including the steps of;

deriving from said digital optical signal one or more duplicate digital optical signals which are each a duplicate of the digital bit-patterns present within the optical signal;

deriving from said digital optical signal one or more polarity-inverted duplicate digital optical signals, the polarity of each bit of which is the inverse of that of the signal bit from which it is derived;

deriving from said duplicate signals and said polarity-inverted duplicate signals an optical detection signal which indicates the presence or absence of said predetermined amplitude-modulated digital bit-pattern within the digital optical signal.

Preferably, the method according to the second aspect of the invention includes the step of transmitting through an optical transmission delay means said duplicate signals and said polarity-inverted duplicate signals derived from said digital optical signal, and;

deriving said optical detection signal from a combination of said duplicate signals and said polarity-inverted duplicate signals output of said optical delay means.

Preferably, said duplicate signals and said polarity-inverted duplicate signals are each conveyed via optical radiation of a wavelength different from that of the radiation conveying any of the other signal duplicates.

More preferably, respective ones of said duplicate signals and said polarity-inverted duplicate signals are transmitted through respective individual ones of a plurality of separate optical transmission delay means, wherein;

said optical detection signal is derived from a combination of the delayed duplicate signals and the delayed polarity-inverted duplicate signals output of said optical delay means.

It is further preferable that each one of said separate transmission delay means provides a transmission delay which differs from that provided by any of the other transmission delay means by an amount equal to an integer multiple of the optical bit period associated with said predetermined amplitude-modulated digital bit-pattern.

In preferred embodiments of the invention respective ones of said duplicate signals and said polarity-inverted duplicate signals are directed to respective individual ones of said separate optical delay means in dependance upon the wavelength of the radiation conveying each respective duplicate signal.

The method may preferably further include the step of combining in equal proportion the delayed duplicate and polarity-inverted duplicate signals output from each one of said transmission delay means so as to thereby derive said optical detection signal.

In preferred embodiments the signal duplicating and inverting is provided via the process of Cross-Gain Modulation of a semiconductor optical amplifier (SOA) operable to output an optical signal which is the polarity-inverted duplicate of optical signal radiation input thereto. Furthermore, signal duplicating is preferably provided via the process of Cross-Gain Modulation two concatenated semiconductor optical amplifiers (SOA) each operable to output an optical signal which is the polarity-inverted duplicate of optical signal radiation input thereto.

Suitably, the method according to the second aspect of the present invention additionally includes the steps of;

partitioning optical signal radiation input thereto into two portions and optically processing a first of said two portions and transmitting said second such portion via an optical transmission delay line, wherein;

the transmission delay of said second portion is substantially equal to the delay associated with the optical processing of said first portion.

There now follows a non-limiting example of a preferred embodiment of the present invention, illustrated with reference to the following figures.

Figure 1:
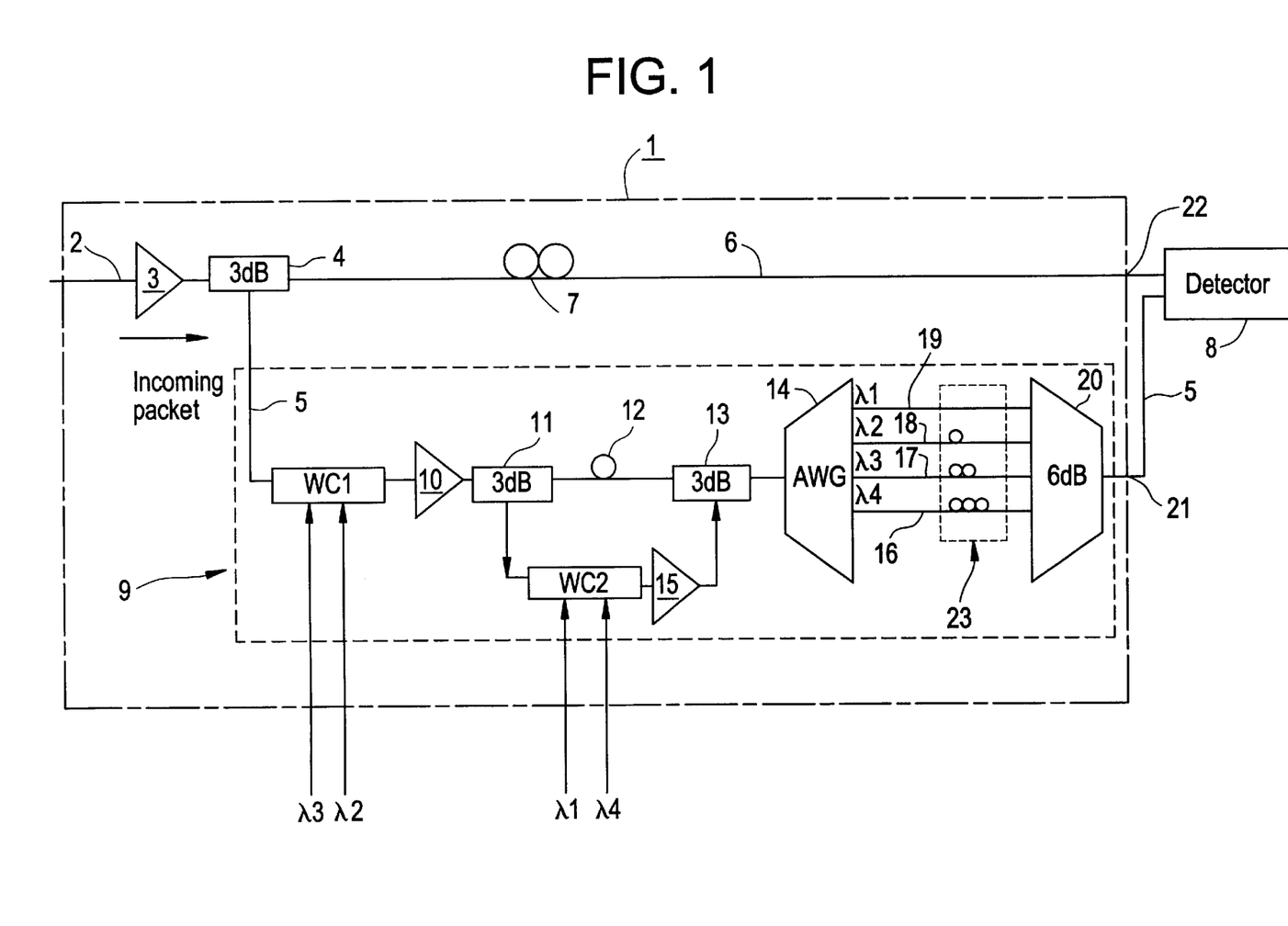
FIG. 1 illustrates an example of the optical signal processing means according to a preferred embodiment of the present invention.

Referring to FIG. 1 there is illustrated an optical signal processor, according to a preferred embodiment of the present invention, for use in the detection of a binary bit-pattern consisting of four consecutive optical bits (e.g. for the binary representation of an integer between 0 and 15) within an input optical signal.

It is to be understood that it is merely for illustrative purposes that the concept of the present invention is illustrated in terms of the detection of a 4-bit optical bit pattern below. It is to be understood that, as shall be discussed, in alternative embodiments the present invention may be applied to the detection of optical bit-patterns consisting of any number of optical bits.

The signal processor, generally denoted 1, possesses an optical input port 2 via which optical signals may be input the processor 1 for subsequent processing. Input port 2 is optically coupled to the optical input of an optical amplifier 3 the optical output of which is coupled to subsequent optical transmission lines 5 and 6 via an optical splitter 4. Optical splitter 4 (in the present embodiment) is a 3 dB splitter operable to output to each one of transmission paths 5 and 6 substantially one half of the optical signal radiation (i.e. power) input to the splitter from preceding optical amplifier 3.

Thus, splitter 4 can be seen to provide at respective ones of its output ports a respective one of two substantially identical copies ("copy A" and "copy B") of the or any optical signal radiation input the processor 1 via input port 2. Splitter 4 may be other than a 3 dB splitter (e.g. an optical tap operable to tap only a small portion of optical power into copy A)

Transmission path 6 optically couples one optical output of splitter 4 to a first optical output 22 of processor 1 via optical delay line 7 and thence, in the present embodiment, to an optical input of an optical signal detector 8. Similarly, optical transmission path 5 optically couples the second optical output of splitter 3 via optical processing elements 9 to a second optical output 21 of processor 1 and to a second optical input of detector 8.

According to the present embodiment optical detector 8 is preferably an opto-electric device operable to provide an electrical signal in response to optical signals input thereto via output port 21 of processor 1. For example, the detector 8 may be operable to monitor the optical power of signals input thereto via port 21 and to provide an indication (e.g. an electrical signal) of when the input optical power exceeds (or falls below) a pre-set threshold value.

It is to be understood that additional optical components, both passive and active, may be included in or associated with detector 8. Preferably, one or more of any such additional components (e.g. an optical switch) may be operable to be controlled via electrical signals output of detector 8 in response to optical signals input thereto from optical processor 9.

The optical signal copy B transmitted to output port 22 via transmission line 6 preferably undergoes no deliberate alteration during such transmission. Thus, it can be seen that, according to the present embodiment, in splitting optical signals input thereto into two copies (copy A and copy B) prior to subsequent processing of a chosen one (copy A) of those two copies by processing elements 9, optical signal processor 1 enables optical processing of input optical signals substantially without loss of information conveyed thereby.

Optical processing element 9 consists of a first wavelength-converting device WC1 into which copy A of the original optical signal may be input from optical splitter 4 for subsequent wavelength conversion. In particular, wavelength-converter WC1 includes a semi-conductor optical amplifier (SOA) operable to employ Cross-Gain Modulation in the conversion of digitally amplitude-modulated optical signals input thereto from splitter 4 into two polarity-inverted duplicate digital optical signals. Each such duplicate is respectively conveyed via optical radiation of a given one of two respective predetermined carrier wavelengths (e.g. $\lambda_3$ and $\lambda_2$) which preferably each differ from that of the original optical signal radiation $\lambda_{SIGNAL}$ input thereto from splitter 4.

Figure 2:
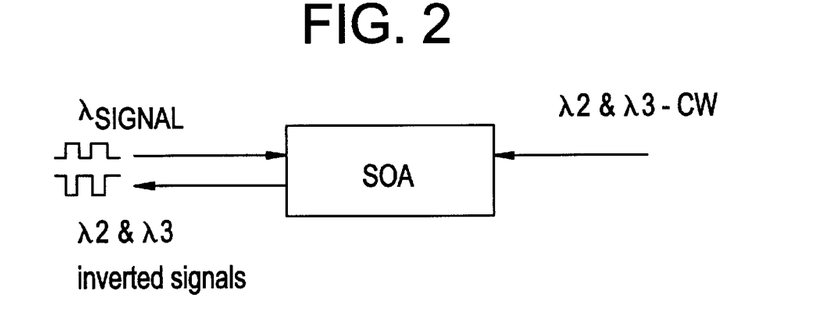
FIG. 2 schematically illustrates the process of Cross-Gain Modulation of semi-conductor optical amplifiers.

FIG. 2 illustrates the general principles of signal wavelength conversion and simultaneous signal polarity inversion employed by the SOA of WC1. As illustrated, an amplitude modulated optical signal of wavelength $\lambda_{SIGNAL}$ is input to the SOA. The optical power of the "marks" (e.g. binary data "1" pulses) present in the amplitude modulated signal causes depletion of charge carriers within the semiconductor material of the SOA thereby leading to gain saturation therein. Conversely, any "spaces" (e.g. binary data "0" pulses) present within the optical signal do not lead to such saturation.

Thus, the presence of an intensity "mark" (or "space") in the input optical signal induces a corresponding "space" (or "mark") in the semiconductor carrier density within the SOA, and therefore in the gain profile (as a function of time) thereof. That is to say, amplitude modulation of the optical signal input the SOA induces reciprocal (i.e. inverse) modulation of the SOA gain as a function of time.

By simultaneously introducing continuous-wave (CW) radiation of a chosen wavelength(s) (e.g. $\lambda_3$ and $\lambda_2$) into the SOA for propagation therethrough under the aforementioned gain-modulation conditions, a corresponding modulation in the amplitude (i.e. gain) of that CW radiation in accordance with the optical amplifier gain modulation may be achieved. Subsequently, the CW radiation so modulated is output of the SOA and thereby provides a polarity-inverted duplicate of the original signal radiation input to the SOA. This is known in the art as "Cross-Gain Modulation".

An advantage of employing SOAs in the present invention is their bit rate insensitivity. These devices have been shown to operate at bit-rates of up to 80 Gbit/s. As will be readily apparent to the skilled person, the SOAs employed in the optical signal processor of the present embodiment are substantially the only active optical components employed. All other components are passive and are relatively insensitive to signal bit-rate changes. This renders the optical processor similarly insensitive.

It will be appreciated that the wavelength of the CW radiation introduced into the SOA for this purpose need not be equal to that of the original optical signal $\lambda_{SIGNAL}$ and, indeed, may typically be any value within the operating range of a given SOA. Multiple such CW wavelengths may be simultaneously introduced into the SOA for simultaneous polarity-inverted duplication of the input signal. This is the case according to the present embodiment. As will be discussed in more detail below, an advantage of producing signal duplicates at different wavelengths lies in the subsequent ability to simultaneously propagate such signals along the same transmission line and then, on the basis of wavelength, separate those duplicates for simultaneous optical processing (e.g. delay etc.).

Thus, wavelength converter WC1 accordingly enables the input of CW radiation of separate wavelengths $\lambda_3$ and $\lambda_2$ (which preferably differ from $\lambda_{SIGNAL}$) into the SOA therein. Accordingly, two polarity-inverted duplicates of optical signal radiation input to the wavelength converter (e.g. copy A) will be subsequently output thereby. One duplicate will be produced at wavelength $\lambda_3$ and the other at $\lambda_2$. More (or fewer) polarity-inverted duplicates may be produced by introducing additional (or removing) CW radiation of specific wavelengths into (or from) WC1 as described above.

The optical output of WC1 is optically coupled via optical amplifier 10 to an optical splitter 11. Preferably, splitter 11 is a 3 dB optical splitter and operates in substantially the same manner as optical splitter 4 described above. In particular, splitter 11 is operable to split any radiation input thereto from WC1 into two substantially equal copies thereof, each having substantially the same optical power, and to separately output those two copies via a respective two separate optical output ports.

The said two separate output ports of splitter 11 are each optically coupled to a respective optical input port of optical combiner 13. The first output port of the former is so coupled via a length of optical delay line 12, while the second output port is coupled to combiner 13 via wavelength converter WC2 and subsequent optical amplifier 15.

According to the present embodiment, wavelength converter WC2 consists of an SOA operable to employ Cross-Gain Modulation in the production of one or more polarity-inverted duplicates, of chosen wavelengths, of radiation input thereto from splitter 11. The operation of wavelength converter WC2 is the same as that described previously in relation to wavelength converter WC1 and shall not be discussed further.

Accordingly, CW radiation of separate wavelengths $\lambda_1$ and $\lambda_4$ may be input to the SOA of WC2 of the present embodiment so as to affect the output thereby of two polarity-inverted duplicates of the optical radiation input thereto from splitter 11. One duplicate will be produced at wavelength $\lambda_1$ and the other at $\lambda_4$. More (or fewer) polarity-inverted duplicates may be produced by introducing additional (or removing) CW radiation of specific wavelengths into (or from) WC2 as described above.

An optical output port of combiner 13 is optically coupled to an optical input port of optical de-multiplexer 14. At combiner 13 any radiation input thereto from splitter 11 and optical amplifier 15 is recombined and subsequently output therefrom for input to optical multiplexer 14.

Optical amplifiers 3, 10 and 15 are preferably rare-earth (e.g. Erbium) doped-fibre optical amplifiers, but any one may alternatively be a semiconductor optical amplifier or the like. Preferably, combiner 13 is a 3 dB combiner designed such that substantially half of the optical power associated with each optical signal input thereto is subsequently output thereby within the combined optical output signal. The combiner 13 may be other than a 3 dB combiner of course. The CW radiation input to wavelength converters WC1 and WC2 is preferably laser radiation derived from a laser radiation source such as a semiconductor laser or the like.

The de-multiplexing means 14 consists preferably of an arrayed waveguide grating (AWG) de-multiplexer possessing four optical output ports each one of which is individually coupled to a respective one of four input ports of optical combiner 20 via respective ones of the four optical transmission lines 16, 17, 18 and 19. These four transmission lines are preferably formed of optical fibre and each one incorporates one of zero, one, two or three substantially identical optical transmission delay lines as collectively indicated 23 in FIG. 1.

Each one such delay line (indicated as a loop in FIG. 1) is designed so as to delay by a fixed and predetermined amount of time, the receipt at combiner 20 of optical signals transmitted therethrough from de-multiplexer 14 to combiner 20. This amount of time (delay) is determined by an appropriate choice of the length of the delay lines. In the absence of these delay lines, the four transmission lines 16–19 are otherwise substantially identical so as to ensure that any and all relative transmission delays therebetween are as a result only of relative differences in delay lines 23 incorporated therein.

It will be appreciated that AWG de-multiplexer 14 is operable to direct radiation input thereto from combiner 13 to respective ones of the four optical transmission lines 16, 17, 18 and 19 according to the optical wavelength of that input radiation (e.g. $\lambda_1$, $\lambda_2$, $\lambda_3$, and $\lambda_4$), as is known in the art. That is to say, signal radiation of wavelengths $\lambda_1$ to $\lambda_4$ respectively input to AWG 14 will subsequently be directed thereby to respective transmission lines 19 to 16.

According to the present embodiment, combiner 20 is a 6 dB combiner the optical output port of which is coupled by transmission line 5 to output port 21 of processor 1 and thence to an input of optical detector 8. The combiner is operable to simultaneously input to transmission line 5 one quarter of the radiation (i.e. the power thereof) input to the combiner via each respective one of the four transmission lines 16–19. Thus, combiner 20 thereby provides an optical output signal comprising the combined sum of the optical signals input thereto (at wavelengths $\lambda_1$, $\lambda_2$, $\lambda_3$, and $\lambda_4$) in equal proportion.

As shall now be discussed, the optical signal processor according to the embodiment of FIG. 1 may be employed in the recognition of a predetermined four-bit binary sequence within an optical signal input thereto. In particular, this embodiment is applicable to the detection of a four-bit sequence containing only two binary "1" digits.

Consider the following illustrative situation in which an optical signal consisting of a four-bit binary sequence (e.g. an optical data packet or packet header) is input to optical processor 1 at input port 2 thereof. After initial amplification by optical amplifier 3 this signal is subsequently split into two copies thereof of equal optical power (copy A and copy B) by optical splitter 4. Copy B subsequently traverses optical transmission line 6 via delay line 7 to optical output port 22 of processor 1, while copy A traverses optical transmission line 5 via optical processing elements 9 to optical output port 21. Delay line 7 is designed such that the transmission delay associated with transmission of signal copy B from splitter 4 to port 22 is substantially equal to the delay associated with transmission of signal copy A from splitter 4 to port 21.

Thus delay line 7 permits the delay associated at least with the optical processing of copy A by elements 9 to be accounted for, thereby ensuring the substantially simultaneous arrival at output ports 22 and 21 of signal copy B and optically processed signal copy A respectively.

Turning to the optical processing of signal copy A. Wavelength converter WC1 has input thereto two CW light waves of wavelength $\lambda_3$ and $\lambda_2$ respectively. These light waves are preferably each separately derived from radiation sources which are substantially steady and continuous at least for the duration of time required to wavelength-convert and polarity-invert the signal copy A input to WC1. By the process of Cross-Gain Modulation described above, WC1 simultaneously outputs to optical amplifier 10 two polarity-inverted duplicates of the bit pattern of signal copy A. One such duplicate signal being carried via the radiation of wavelength $\lambda_3$ and the other via $\lambda_2$.

Subsequent to preferably equal amplification by amplifier 10 and the two polarity-inverted bit patterns traverse optical splitter 11 wherein each is split into two copies thereof of equal optical power. One copy of each of the polarity-inverted duplicates is subsequently transmitted via delay line 12 to an optical input port of combiner 13, while the other of each such copies enters wavelength converter WC2. Wavelength converter WC2 has input thereto two CW light waves of wavelength $\lambda_1$ and $\lambda_4$ respectively. These light waves are preferably each separately derived from radiation sources which are substantially steady and continuous at least for the duration of time required to wavelength-convert and polarity-invert the two duplicate signals input to WC2. By the process of Cross-Gain Modulation described above, WC2 simultaneously outputs to optical amplifier 15 two polarity-inverted duplicates of the bit pattern of the previously polarity-inverted duplicates of original signal copy A. One such doubly-inverted duplicate signal being carried via the radiation of wavelength $\lambda_1$ and the other via $\lambda_4$.

Of course, it will be readily appreciated that in "doubly-inverting" signal copy A in this way, wavelength WC2 has the effect of reverting the bit-polarity of the duplicates input thereto into the polarity of the original bit pattern in signal copy A.

Delay line 12 permits the delay associated at least with the optical processing of polarity-inverted signal duplicates $\lambda_3$ and $\lambda_2$ by elements WC2 and 15 to be accounted for, thereby ensuring that polarity-inverted duplicates $\lambda_3$ and $\lambda_2$ arrive at combiner 13 substantially simultaneously with polarity-reverted duplicates $\lambda_1$ and $\lambda_4$. Upon such simultaneous arrival, combiner 13 combines both of the polarity-inverted duplicates $\lambda_2$ and $\lambda_3$ with both of the polarity-reverted duplicates $\lambda_1$ and $\lambda_4$ in substantially equal proportions (half of the signal power of each such duplicate input to combiner 13 is coupled to the output port thereof during this combination).

Thus, four duplicates of the optical bit-pattern originally input processor 1 at port 2 are subsequently simultaneously input to AWG 14 as a composite. Two such duplicates have polarity-inverted bit patterns, while all four are conveyed via separate carrier wavelengths. Consequently, AWG 14 separates this composite optical signal into its constituent components and directs each such component to a predetermined one of the four transmission lines 16–19.

As will be readily appreciated, the transmission line to which any one signal component is directed is predetermined by the wavelength of the carrier radiation via which the particular component is conveyed. Thus, by choosing the appropriate carrier wavelengths ($\lambda_1$, $\lambda_2$, $\lambda_3$ or $\lambda_4$) via which to convey the polarity-inverted/reverted duplicate signals, each one of those signals may be directed to a predetermined one of the transmission lines 16–19 by AWG 14.

According to the present embodiment the AWG 14 is operable to direct input radiation of wavelength $\lambda_1$ to transmission line 19; input signal radiation of wavelength $\lambda_2$ to transmission line 18; input signal radiation of wavelength $\lambda_3$ to transmission line 17; and input signal radiation of wavelength $\lambda_4$ to transmission line 16. Transmission lines 16, 17 and 18 respectively incorporate three, two and one optical delay lines (each indicated by a loop thereon). Each one of these delay lines is so incorporated to increase the optical path length of the respective transmission line to ensure that the time required for a given duplicate optical signal to traverse that transmission line is increased by an amount equal to one bit-period of the optical bit pattern associated with the predetermined amplitude-modulated digital bit pattern to be detected. In the present embodiment it is assumed that all input signals are of a bit rate equal to that of the signal to be detected.

Thus, duplicate signal $\lambda_2$ reaches combiner 20 one optical bit-period behind duplicate signal $\lambda_1$; duplicate signal $\lambda_3$ reaches combiner 20 one optical bit-period behind duplicate signal $\lambda_2$; and duplicate signal $\lambda_4$ reaches combiner 20 one optical bit-period behind duplicate signal $\lambda_3$. Combiner 20 optically correlates these four duplicate signals by subsequently summing the amplitudes of these relatively delayed duplicate optical bit patterns in equal proportion so as to provide at output port 21 a multi-wavelength optical correlation signal having an amplitude modulated in accordance with this sum. As will be discussed below, the amplitude of this optical correlation signal may be used to indicate the presence of a predetermined optical bit-pattern within the original signal input at port 2.

Figure 7:
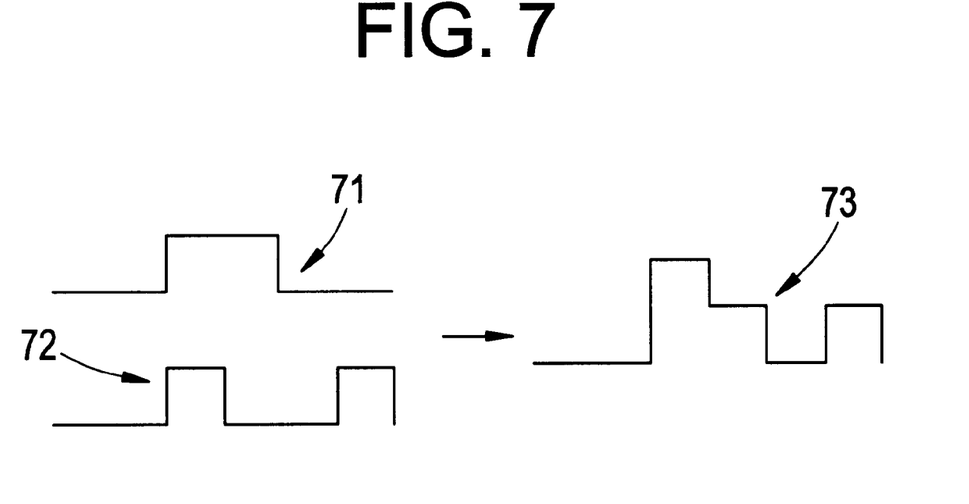
FIG. 7 schematically illustrates optical correlation of amplitude-modulated optical bits.

For illustrative purposes, FIG. 7 shows a schematic of what is meant by optical correlation. Optical bit pattern 71 ("1100") is directly added to optical bit pattern 72 ("1001") to produce optical correlation signal 73. The amplitude of the correlation signal at each one of its four bit periods is equal to the sum of the bit amplitudes in each one of the constituent signals 71 and 72. The highest amplitude occurs at the first bit thereby indicating that the two signals 71 and 72 are maximally correlated ("most similar") at their first bit period.

It is to be noted that optical amplifiers 3, 10 and 15 are preferably to be controlled so as to ensure that copies A and B of the signal radiation input at port 2 are each of a sufficient amplitude to enable each to be further processed, or even merely detected, beyond output ports 21 and 22 respectively. Furthermore, amplifiers 10 and 15 are preferably additionally controlled so as to ensure that the binary "1" bit pulses of each one of the four polarity-inverted/reverted signal duplicates input to AWG 14 are of substantially equal amplitude.

Preferably, the amplifiers may be further controlled to ensure that the amplitude of any single data "1" pulses in the bit-pattern output from combiner 20 are substantially equal (or at least comparable) in magnitude to individual data "1" pulses in copy B at port 22.

The embodiment of the present invention illustrated FIG. 1 is particularly operable to indicate the presence of the optical digital bit pattern "1001" or "0110" within an optical signal as follows.

Figure 3:
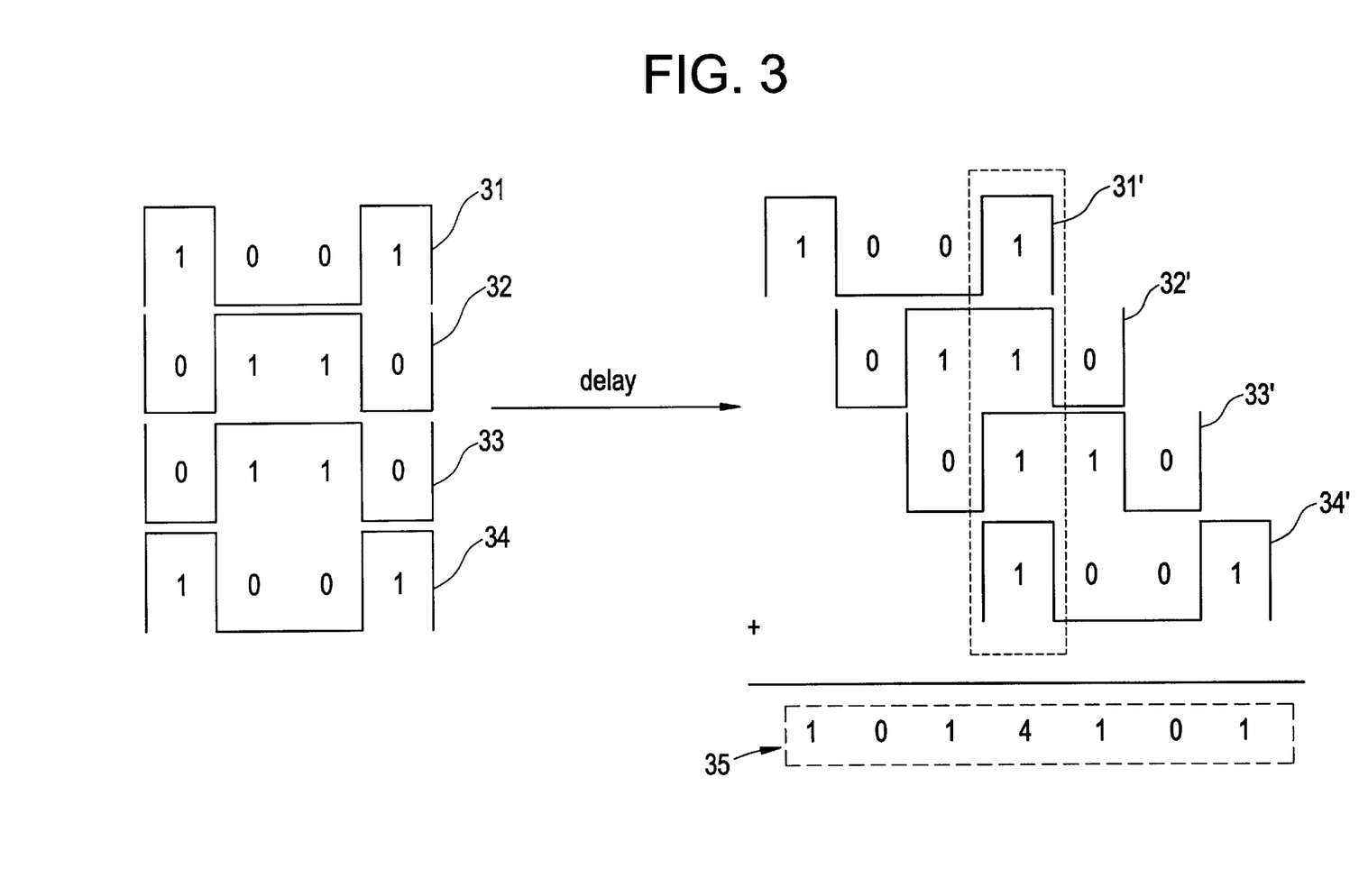
FIG. 3 illustrates polarity-inverted and reverted duplicates of the optical bit patters "1001", the consequences of subsequent delay and the consequences of further subsequent optical correlation by an optical combiner.

Consider that the optical bit pattern "1001" is present in an optical signal (e.g. an optical data packet or packet header) input to optical processor 1 of FIG. 1. FIG. 3 schematically illustrates the optical waveforms 31, 32, 33 and 34 of the polarity-inverted/reverted duplicate signals derived from that input signal by wavelength converters WC1 and WC2. Also indicated is the bit pattern represented by each of those duplicates. In particular, polarity-reverted duplicates 31 and 34 derive from wavelength converter WC2 and are respectively of wavelengths $\lambda_1$ and $\lambda_4$, while polarity-inverted duplicates 32 and 33 derive from wavelength converter WC1 and are respectively of wavelengths $\lambda_2$ and $\lambda_3$.

The relative positions of duplicates 31 to 34 of FIG. 3 graphically illustrates the relative positions (in time) of those duplicates when simultaneously input to respective transmission lines 19 to 16 of processor 1 by AWG 14 thereof. The consequences of the relative delays between the duplicates incurred by those transmission lines can be seen by the relative positions (in time) of the duplicate signals 31', 32', 33' and 34' subsequently output of transmission lines 19, 18, 17 and 16 respectively. Successive duplicate signals 32' to 34' are successively delayed relative to signal duplicate 31' by one, two and three optical bit-periods respectively.

It will be readily apparent that a consequence of this relative delay is to cause one data "1" bit pulse in any one of the four duplicate signals to overlap (in time) with a data "1" bit pulse in each of the other duplicate signals. In combining the four duplicate signals 31' to 34' at combiner 20, an optical correlation signal is provided thereby consisting of a sequence of optical pulses having amplitudes (in units normalized to the amplitude of each optical "1" bit pulse) as represented by the sequence 35 of FIG. 3. A maximum optical correlation amplitude of 4 occurs during the aforementioned bit-period in which four data "1" bit pulses of the four signal duplicates coincide. This condition is achieved during only one bit-period of the seven distinct successive bit-periods associated with the said four relatively delayed duplicate signals and only occurs when the duplicate signals derive from an optical signal carrying the optical bit sequence "1001".

Consequently, the presence of an optical correlation pulse of normalized amplitude "4" at the optical output 21 of optical processor 1 indicates the presence of the optical bit-sequence "1001" within the optical signal simultaneously present (i.e. copy B) at optical output port 22 thereof. Optical detector 8 may be operable to detect this optical correlation pulse opto-electrically. Preferably, one or more additional components (e.g. an optical switch, routing equipment) may be operable to be controlled via electrical signals output of detector 8 in response to the optical correlation peak pulse input thereto from optical processor 1.

It is to be noted that the representation 35 of the amplitude pattern of the optical correlation signal output of combiner 20 corresponds to the contribution to that output from the individual duplicate bit patterns 31', 32' 33' and 34' alone. Of course, it will be readily appreciated that each one such duplicate bit pattern may be bounded by proceeding and succeeding bit patterns which add to the amplitude pattern 35. However, it is to be noted that any such proceeding/succeeding bits will not effect the central bit ("4" in this case) at which each of the individual duplicate bit patterns 31', 32' 33' and 34' overlap.

Figure 4A:
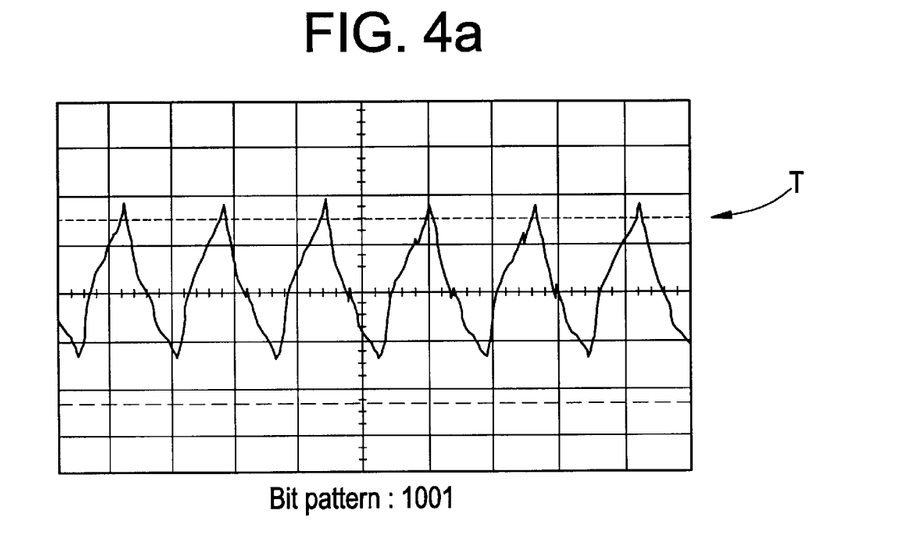
FIG. 4a illustrates an oscilloscope trace associated with detection of the bit sequence "1001".

FIG. 4a illustrates a typical oscilloscope trace derived (during experiment) from the output of a photo-detector 8 coupled to the optical output port 21 of optical processor 1 when an optical signal comprising a continuous and repetitive stream of the optical bit sequence "1001" was input thereto. The timebase (horizontal scale) of the trace is 1ns/division, while the vertical scale is 200 mV/division.

As can be seen, the waveform of the photo-detector signal, and thus the trace of the oscilloscope, is periodic and repeats every 4 bit-periods as expected. A voltage peak in the oscilloscope trace occurs once within that period and corresponds to the optical correlation amplitude "4" (as in FIG. 3) associated with the simultaneous presence of four data "1" optical pulses in the combined output of combiner 20. In particular, the oscilloscope waveform results from the optical bit pattern "... 202420242024 ... " output of combiner 20.

The detector 8 may preferably be combined or associated with signal monitoring means operable to indicate when the photo-detector signal exceeds a predetermined threshold value such as the value "T" indicated in FIG. 4a. Typically this threshold value would be set to a value just below that representative of an optical correlation signal amplitude of 4-times (4×) the amplitude of a single optical bit-pulse. Thus, detection of such an optical correlation signal amplitude by photo-detector 8 would result in a detector signal exceeding threshold "T". The monitoring means of or associated with the detector would consequently indicate this fact.

Figure 4B:
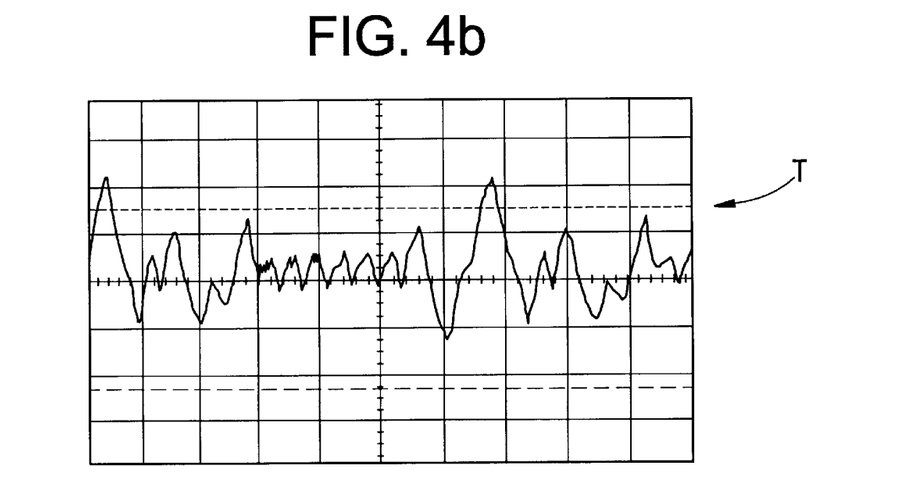
FIG. 4b illustrates an oscilloscope trace associated with detection of the bit sequence "1001" with in a 16-bit sequence.

FIG. 4b illustrates a typical oscilloscope trace derived (during experiment) from the output of a photo-detector 8 coupled to the optical output port 21 of optical processor 1 when an optical signal comprising a continuous and repetitive stream of the optical 16-bit sequence "1001010101010101" was input thereto. One 4-bit sequence "1001" is contained therein and, as can be seen with reference to the two peaks (separated by 16 bit-periods in time), the presence of this 4-bit sequence is indicated.

Figure 5A:
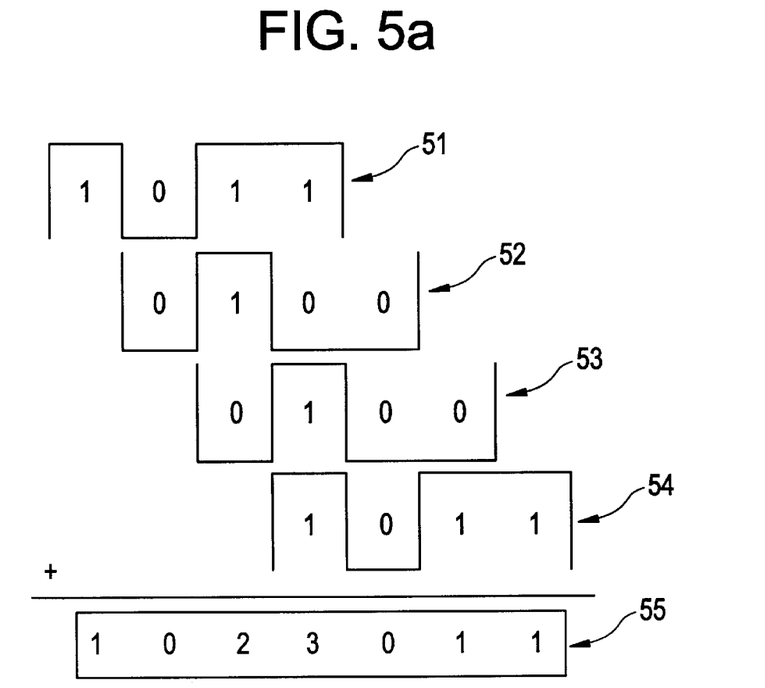
FIG. 5a illustrates the optical correlation of the bit sequence "1011" in an optical processor designed to detect the bit sequence "1001".

Consider inputting the single bit-sequence "1011" into the optical processor 1 of FIG. 1 at input port 2. The resulting four polarity-inverted/reverted duplicate bit patterns 51, 52, 53, and 54, derived from this bit-sequence by wavelength-converters WC1 or WC2, are illustrated in FIG. 5a after having been delayed by transmission lines 19, 18, 17 and 16 respectively. Amplitude pattern 55 illustrates the (normalized) amplitude of the optical correlation pulse sequence resulting from combining these four relatively delayed duplicate signals at combiner 20. As will be immediately apparent, a normalised optical correlation amplitude of "4" is not produced. The maximum amplitude is "3". Thus, the optical correlation signal output of combiner 20 and port 21 would correctly indicate that bit sequence "1001" is not present within the original input signal ("1011"). Consequently, the threshold "T" would not be exceeded by the corresponding detector signal output of detector 8.

By controlling which of the wavelength converters WC1 and WC2 each one of the CW radiations ($\lambda_1$, $\lambda_2$, $\lambda_3$ and $\lambda_4$) is input to, the optical signal processor 1 of FIG. 1 may be adapted, in preferred embodiments of the present invention, to determine the presence of any four-bit digital sequence within an optical signal input thereto. An additional advantage of employing separate carrier wavelengths for each one of the duplicate signals (of any polarity) is that interferometric interference between the signal duplicates in the correlation signal output of combiner 20 is minimised. The present invention may be implemented with each duplicate being carried at the same carrier wavelength but experiments have shown that under such conditions frequency beating arose in the correlation signal which caused the power level thereof to be unstable, thus making it difficult of impossible to set an appropriate detection threshold "T".

In particular, it is to be noted that the number of polarity-inverted duplicates input to de-multiplexer 14 and the particular delay line that each one is subsequently transmitted through is predetermined by the number of binary "0" bits present within the predetermined bit sequence to be detected (this is true irrespective of the number of bits in that predetermined sequence). Since the wavelength converter WC1, according to the embodiment of FIG. 1, is operable to produce all of the polarity-inverted duplicates input to de-multiplexer 14, these conditions amount to requiring that:

(1) the number of CW radiation sources providing a CW radiation input to WC1 is equal to the number of "0" (zero) bits within the predetermined bit-sequence to be detected.

(2) the wavelength of the radiation produced by each one of the CW radiation sources associated with WC1 and WC2 is such that each one of the polarity-inverted/reverted duplicate signals produced thereby will be respectively routed by the de-multiplexer 14 (e.g. AWG) to predetermined respective individual ones of the delay lines connected to an output thereof.

That is to say, regarding point (2), in order to detect a given bit sequence within an input optical signal, the relative delays applied to the four duplicate signals derived therefrom must be such that one data "1" bit-pulse of a given one of the duplicate signals is caused to coincide with a data "1" bit-pulse in each one of the other duplicate signals. For a given bit sequence, this condition is met by only one relative delay arrangement (e.g. as shown in FIG. 3 for the bit sequence "1001") and therefore, by only one de-multiplexer routing arrangement. Since the routing of duplicate signals by de-multiplexer 14 is predetermined by the wavelength of those signals, the subsequent relative delay arrangement of the latter may be controlled by controlling the individual wavelengths via which they are carried (i.e. the CW source wavelengths).

For example, the embodiment illustrated in FIG. 1 may preferably be modified to enable detection of the presence of the optical bit sequence "1011" by inputting CW radiation of wavelength $\lambda_2$ into wavelength converter WC2 rather than into wavelength converter WC1. This has two consequences:

firstly, by providing only one CW radiation source for input to WC1 and by adding one CW radiation source for input to WC2, the number of polarity-inverted duplicate signals produced by WC1 is reduced to one (see condition (1) above) while the total number of duplicates produced by both WC1 and WC2 remains four;

secondly, by ensuring that the additional CW radiation input to WC2 has wavelength $\lambda_2$ one thereby ensures that the polarity-reverted duplicate signal carried thereby will be routed to transmission line 18 as required.

Figure 5B:
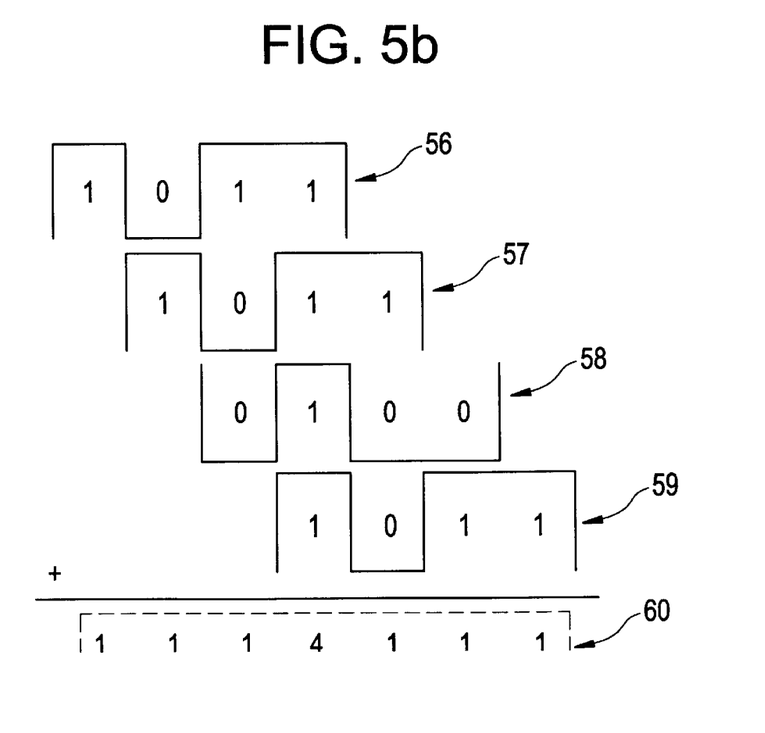
FIG. 5b illustrates the optical correlation of the bit sequence "1011" in an optical processor designed to detect the bit sequence "1011".

The result of such a modification is illustrated in FIG. 5b. This figure illustrates the four polarity-inverted/reverted duplicate bit patterns 56, 57, 58, and 59, derived by wavelength-converters WC1 or WC2 from an optical bit-sequence "1011" originally input at port 2 of modified optical processor 1. Duplicate 58 is the only polarity-inverted duplicate output from WC1 and is conveyed by carrier radiation of wavelength $\lambda_3$ ($\lambda_3$ is the only CW radiation input to WC1). All other duplicates 56, 57 and 59 are derived from CW radiation $\lambda_1$, $\lambda_2$, and $\lambda_4$ input to WC2.

The four duplicates have been delayed by transmission lines 19, 18, 17 and 16 respectively. Amplitude pattern 60 illustrates the (normalized) amplitude of the optical correlation pulse sequence resulting from combining these four relatively delayed duplicate signals at combiner 20. As will be immediately apparent, a normalised optical correlation amplitude of "4" is produced. Thus, the optical correlation signal output of combiner 20 and port 21 would correctly indicate that bit sequence "1011" is present within the original input signal.

It will be readily apparent to the skilled reader that the number of separate CW radiation sources providing a CW input to each one of the wavelength converters WC1 and WC2, and individual wavelengths of the radiation produced by those sources, may be otherwise changed/modified so as to permit detection of the presence of any four-bit optical bit pattern within an optical signal input to optical signal processor 1.

In an alternative embodiment of the present invention, the optical signal processor illustrated in FIG. 1 may be employed in optical bit pattern detection by monitoring the optical correlation output 21 for the presence of a "space" (i.e. a zero bit) within the correlation signal output therefrom. This is to be contrasted with the method described above which amounts to monitoring the correlation signal for a "mark" of maximum amplitude (e.g. of normalized amplitude "4"), or of an amplitude exceeding a predetermined threshold value.

For example, the optical processor 1 of FIG. 1 is also operable to detect the presence of an optical bit sequence "0110" within signals (e.g. an optical data packet or packet header) input thereto according to this alternative detection method.

Figure 6:
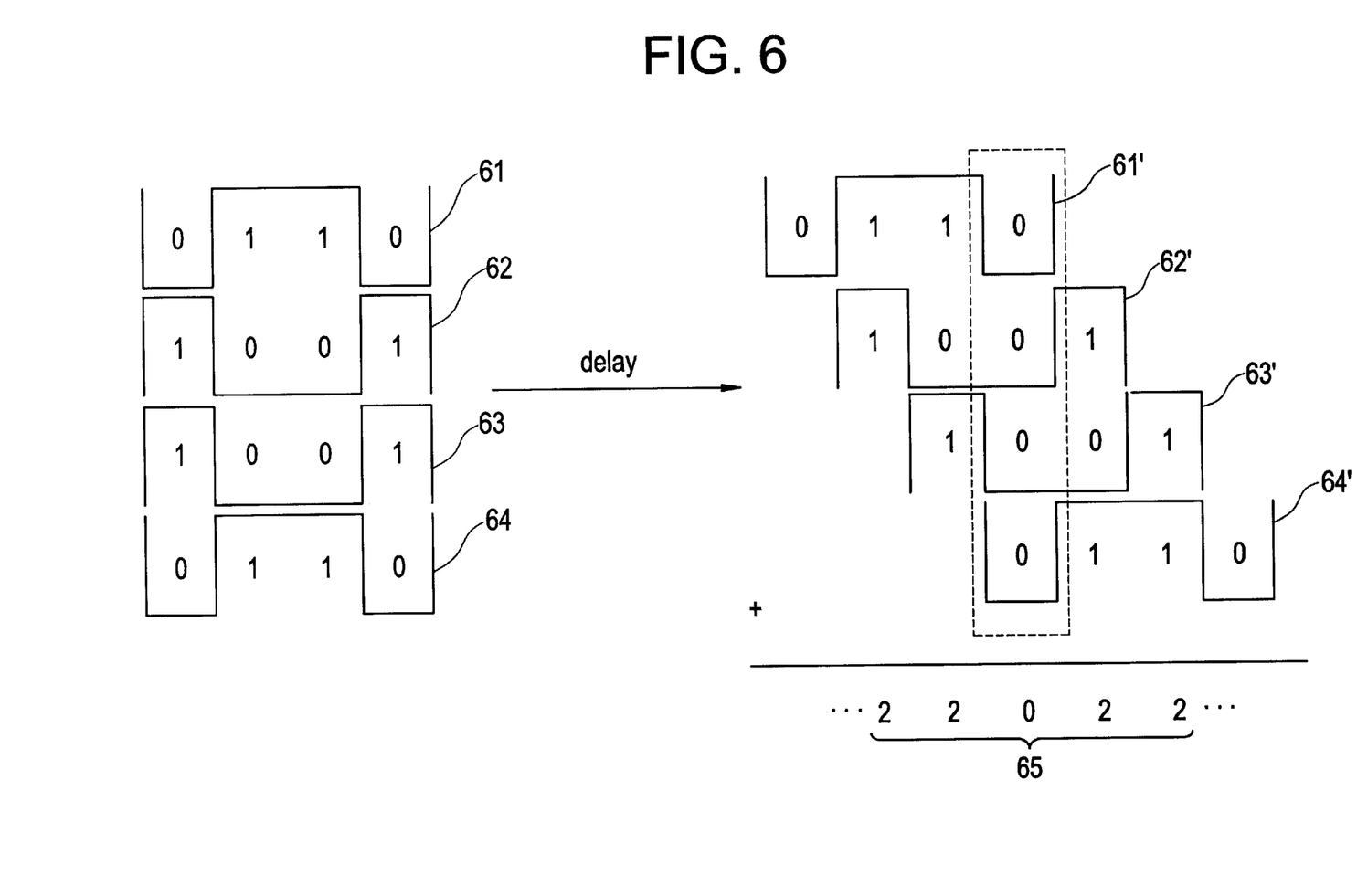
FIG. 6 illustrates polarity-inverted and reverted duplicates of the optical bit patters "0110", the consequences of subsequent delay and the consequences of further subsequent optical correlation by an optical combiner.

Consider inputting the single bit-sequence "0110" into the optical processor 1 of FIG. 1 at input port 2. FIG. 6 schematically illustrates the optical waveforms 61, 62, 63 and 64 of the polarity-inverted/reverted duplicate signals derived from that input signal by wavelength converters WC1 and WC2. Also indicated is the bit pattern represented by each of those duplicates. In particular, polarity-reverted duplicates 61 and 64 derive from wavelength converter WC2 and are respectively of wavelengths $\lambda_1$ and $\lambda_4$, while polarity-inverted duplicates 62 and 63 derive from wavelength converter WC1 and are respectively of wavelengths $\lambda_2$ and $\lambda_3$.

The relative positions of duplicates 61 to 64 of FIG. 6 graphically illustrates the relative positions (in time) of those duplicates when simultaneously input to respective transmission lines 19 to 16 of processor 1 by AWG 14 thereof.

The resulting four polarity-inverted/reverted duplicate bit patterns 61', 62', 63', and 64', derived from this bit-sequence by wavelength-converters WC1 or WC2, are illustrated in FIG. 6 after having been delayed by transmission lines 19, 18, 17 and 16 respectively. Amplitude pattern 65 illustrates the (normalized) amplitude of the optical correlation pulse sequence resulting from combining these four relatively delayed duplicate signals at combiner 20. As will be immediately apparent, a normalised correlation amplitude of "0" (i.e. a "space") is produced within this amplitude pattern.

Thus, the optical correlation signal output of combiner 20 and port 21 may be interpreted as indicating that bit sequence "0110" is present within the original input signal ("0110") since no other input bit sequence would produce this result when input the optical processor of FIG. 1.

It is to be noted that the representation 65 of the amplitude pattern of the optical correlation signal output of combiner 20 corresponds to the contribution to that output from the individual duplicate bit patterns 61', 62'63' and 64' alone. Of course, it will be readily appreciated that each one such duplicate bit pattern may be bounded by proceeding and succeeding bit patterns which add to the amplitude pattern 65. However, it is to be noted that any such proceeding/ succeeding bits will not effect the central bit ("space" in this case) at which each of the individual duplicate bit patterns 61', 62'63' and 64' overlap.

The detector 8 of FIG. 1 may preferably be combined or associated with signal monitoring means operable to indicate when the photo-detector output signal drops to substantially zero or to below a predetermined threshold value, and thereby indicate the presence of bit-sequence "0110" within the optical signal originally input processor 1 at port 2.

According to this alternative detection method, the number of polarity-inverted duplicates input to de-multiplexer 14 and the particular delay line that each one is subsequently transmitted through is predetermined by the number of binary "1" bits present within the predetermined bit sequence to be detected (this is true irrespective of the number of bits in that predetermined sequence). Since the wavelength converter WC1, according to the embodiment of FIG. 1, is operable to produce all of the polarity-inverted duplicates input to de-multiplexer 14, this amounts to requiring that:

(3) the number of CW radiation sources providing a CW radiation input to WC1 is equal to the number of "1" (one) bits within the predetermined bit-sequence to be detected.

(4) the wavelength of the radiation produced by each one of the CW radiation sources associated with WC1 and WC2 is such that each one of the polarity-inverted/ reverted duplicate signals produced thereby will be respectively routed by the de-multiplexer 14 (e.g. AWG) to predetermined respective individual ones of the delay lines connected to an output thereof.

It will be readily appreciated that the number of CW radiation sources associated with each one of the two wavelength converters WC1 and WC2, and the wavelength of the radiation produced by each such source, may be modified in accordance with points (3) and (4) above so as to adapt the optical signal processor 1 to indicate the presence of any four-bit optical bit pattern according to this alternative detection method.

The optical processor 1 of FIG. 1 may be adapted in accordance with further embodiments, to be operable to detect a predetermined optical bit sequence comprising N optical amplitude-modulated bits. This adaptation consists merely of providing N CW radiation sources each preferably providing CW radiation of a wavelength different from any of the other CW sources so provided.

The number of such CW sources dedicated to wavelength converter WC1 is equal to either the number of "0" (zero) bits or the number of "1" (one) bits present in the choice of the predetermined bit sequence to be detected depending upon the detection method being used (see points (1) and (3) above). The remaining CW sources would be dedicated to wavelength converter WC2. Thus, N polarity-inverter/ reverted duplicate signals will be produced by wavelength converters WC1 and WC2.

Of course the number of separate transmission lines coupling de-multiplexer 14 to combiner 20 would be equal to N, each one of those N transmission lines incorporating one of 0, 1, . . . N N identical delay lines so as to ensure an appropriate relative delay between duplicate signals output thereof and input to combiner 20.

It is to be understood that modifications and variations may be made to the present invention, such as would be readily apparent to the skilled person, without departing from the scope of the invention disclosed herein.

What is claimed is:

1. An optical signal processor for the optical processing of a digitally amplitude-modulated optical signal input thereto, to determine the presence or absence of a predetermined digital bit-pattern within said optical signal, the optical signal processor possessing optical processing means including;

signal duplicating means operable to derive from said input digital optical signal one or more duplicate digital optical signals which are each a duplicate of the digital bit-patterns present within the input optical signal;

signal duplicating and inverting means operable to derive from said input digital optical signal one or more polarity-inverted duplicate digital optical signals, the polarity of each bit of which is the inverse of that of the signal bit from which it is derived, wherein;

the optical processing means is operable to derive from said duplicate signals and said polarity-inverted duplicate signals an optical detection signal which indicates the presence or absence of said predetermined amplitude-modulated digital bit-pattern within the input digital signal processed thereby.

2. An optical signal processor according to claim 1 wherein the optical processing means further includes optical transmission delay means and is operable to transmit through said delay means said duplicate signals and said polarity-inverted duplicate signals derived from said input digital optical signal, wherein;
the optical processing means is operable to derive said optical detection signal from a combination of said duplicate signals and said polarity-inverted duplicate signals output of said optical delay means.

3. An optical signal processor according to claim 2 wherein the optical delay means includes a plurality of separate optical transmission delay lines the optical transmission delay provided by each one of which is determined by the length thereof.

4. An optical signal processor according to claim 2 wherein the optical processing means includes optical combining means for combining in equal proportion the delayed duplicate and polarity-inverted duplicate signals output from each one of said transmission delay means so as to thereby derive said optical detection signal.

5. An optical signal processor according to claim 4 wherein the combining means is an optical combiner.

6. An optical signal processor according to claim 2 wherein the optical processing means includes a plurality of separate optical transmission delay means and is operable to transmit respective ones of said duplicate signals and said polarity-inverted duplicate signals through respective individual ones of the separate optical delay means, wherein;
the optical processing means is operable to derive said optical detection signal from a combination of the delayed duplicate signals and delayed polarity-inverted duplicate signals output of said optical delay means.

7. An optical signal processor according to claim 6 wherein the optical transmission delay provided by each one of said transmission delay means differs from that provided by any of the other transmission delay means by an amount equal to an integer multiple of the optical bit period associated with said predetermined amplitude-modulated digital bit-pattern.

8. An optical signal processor according to claim 6 wherein the optical processing means includes signal routing means operable to direct respective ones of said duplicate signals and said polarity-inverted duplicate signals input thereto to respective individual ones of said separate optical delay means in dependance upon the wavelength of the radiation conveying each respective duplicate signal.

9. An optical signal processor according to claim 8 wherein the signal routing means is an optical de-multiplexer.

10. An optical signal processor according to claim 9 wherein the signal routing means is an arrayed-waveguide (AWG) optical de-multiplexer.

11. An optical signal processor according to claim 1 wherein said signal duplicating means and said signal duplicating and inverting means are operable to produce one or more duplicate signals (polarity-inverted or otherwise) each one of which is conveyed via optical radiation of a wavelength different from that of the radiation conveying any of the other signal duplicates produced thereby.

12. An optical signal processor according to claim 1 wherein the signal duplicating and inverting means includes a semiconductor optical amplifier (SOA) operable, via the process of Cross-Gain Modulation, to output an optical signal which is the polarity-inverted duplicate of optical signal radiation input thereto.

13. An optical signal processor according to claim 1 wherein the signal duplicating means includes two concatenated semiconductor optical amplifiers (SOA) each operable, via the process of Cross-Gain Modulation, to output an optical signal which is the polarity-inverted duplicate of optical signal radiation input thereto.

14. An optical signal processor according to claim 1 wherein the optical signal processor is operable to partition optical signal radiation input thereto into two portions and to transmit a first such portion via said optical processing means, to a first optical output port thereof and to transmit the second such portion via an optical transmission delay line, to a second optical output of the optical signal processor wherein;
the transmission delay provided by said delay line is such as to permit substantially simultaneous arrival of the optically processed first portion and the delayed second portion at said first and second optical output ports.

15. An optical signal processor for the optical processing of a digitally amplitude-modulated optical signal input thereto, to determine the presence or absence of a predetermined digital bit-pattern within said optical signal, the optical signal processor possessing optical processing means including;
signal duplicating means operable to derive from said input digital optical signal one or more duplicate digital optical signals which are each a duplicate of the digital bit-patterns present within the input optical signal;
signal duplicating and inverting means operable to derive from said input digital optical signal one or more polarity-inverted duplicate digital optical signals, the polarity of each bit of which is the inverse of that of the signal bit from which it is derived, wherein;
the optical processing means is operable to derive from said duplicate signals and said polarity-inverted duplicate signals an optical detection signal which indicates the presence or absence of said predetermined amplitude-modulated digital bit-pattern within the input digital signal processed thereby,
wherein the optical processing means further includes optical transmission delay means and is operable to transmit through said delay means said duplicate signals and said polarity-inverted duplicate signals derived from said input digital optical signal, wherein;
the optical processing means is operable to derive said optical detection signal from a combination of said duplicate signals and said polarity-inverted duplicate signals output of said optical delay means,
wherein said signal duplicating means and said signal duplicating and inverting means are operable to produce one or more duplicate signals (polarity-inverted or otherwise) each one of which is conveyed via optical radiation of a wavelength different from that of the radiation conveying any of the other signal duplicates produced thereby,
wherein the optical processing means includes a plurality of separate optical transmission delay means and is operable to transmit respective ones of said duplicate signals and said polarity-inverted duplicate signals through respective individual ones of the separate optical delay means, wherein;
the optical processing means is operable to derive said optical detection signal from a combination of the delayed duplicate signals and delayed polarity-inverted duplicate signals output of said optical delay means,
wherein the optical transmission delay provided by each one of said transmission delay means differs from that provided by any of the other transmission delay means by an amount equal to an integer multiple of the optical bit period associated with said predetermined amplitude-modulated digital bit-pattern.

16. A method for the optical processing of a digitally amplitude-modulated optical signal so as to determine the presence or absence of a predetermined digital bit-pattern therein, the optical signal processing method including the steps of;

deriving from said digital optical signal one or more duplicate digital optical signals which are each a duplicate of the digital bit-patterns present within the optical signal;

deriving from said digital optical signal one or more polarity-inverted duplicate digital optical signals, the polarity of each bit of which is the inverse of that of the signal bit from which it is derived;

deriving from said duplicate signals and said polarity-inverted duplicate signals an optical detection signal which indicates the presence or absence of said predetermined amplitude-modulated digital bit-pattern within the digital optical signal.

17. A method for the optical processing of a digitally amplitude-modulated optical signal according to claim 16 further including the step of transmitting through an optical transmission delay means said duplicate signals and said polarity-inverted duplicate signals derived from said digital optical signal, and;

deriving said optical detection signal from a combination of said duplicate signals and said polarity-inverted duplicate signals output of said optical delay means.

18. A method for the optical processing of a digitally amplitude-modulated optical signal according to claim 17 wherein respective ones of said duplicate signals and said polarity-inverted duplicate signals are transmitted through respective individual ones of a plurality of separate optical transmission delay means, wherein;

said optical detection signal is derived from a combination of the delayed duplicate signals and the delayed polarity-inverted duplicate signals output of said optical delay means.

19. A method for the optical processing of a digitally amplitude-modulated optical signal according to claim 18 wherein each one of said separate transmission delay means provides a transmission delay which differs from that provided by any of the other transmission delay means by an amount equal to an integer multiple of the optical bit period associated with said predetermined amplitude-modulated digital bit-pattern.

20. A method for the optical processing of a digitally amplitude-modulated optical signal according to claim 18 wherein respective ones of said duplicate signals and said polarity-inverted duplicate signals are directed to respective individual ones of said separate optical delay means in dependance upon the wavelength of the radiation conveying each respective duplicate signal.

21. A method for the optical processing of a digitally amplitude-modulated optical signal according to claim 17 including the step of combining in equal proportion the delayed duplicate and polarity-inverted duplicate signals output from each one of said transmission delay means so as to thereby derive said optical detection signal.

22. A method for the optical processing of a digitally amplitude-modulated optical signal according to claim 16 wherein said duplicate signals and said polarity-inverted duplicate signals are each conveyed via optical radiation of a wavelength different from that of the radiation conveying any of the other signal duplicates.

23. A method for the optical processing of a digitally amplitude-modulated optical signal according to claim 16 wherein the signal duplicating and inverting is provided via the process of Cross-Gain Modulation of a semiconductor optical amplifier (SOA) operable to output an optical signal which is the polarity-inverted duplicate of optical signal radiation input thereto.

24. A method for the optical processing of a digitally amplitude-modulated optical signal according to claim 16 wherein signal duplicating is provided via the process of Cross-Gain Modulation two concatenated semiconductor optical amplifiers (SOA) each operable to output an optical signal which is the polarity-inverted duplicate of optical signal radiation input thereto.

25. A method for the optical processing of a digitally amplitude-modulated optical signal according to any preceding claim including the further steps of;

partitioning optical signal radiation input thereto into two portions and optically processing a first of said two portions and transmitting said second such portion via an optical transmission delay line, wherein;

the transmission delay of said second portion is substantially equal to the delay associated with the optical processing of said first portion.

26. A method for the optical processing of a digitally amplitude-modulated optical signal so as to determine the presence or absence of a predetermined digital bit-pattern therein, the optical signal processing method including the steps of;

deriving from said digital optical signal one or more duplicate digital optical signals which are each a duplicate of the digital bit-patterns present within the optical signal;

deriving from said digital optical signal one or more polarity-inverted duplicate digital optical signals, the polarity of each bit of which is the inverse of that of the signal bit from which it is derived;

deriving from said duplicate signals and said polarity-inverted duplicate signals an optical detection signal which indicates the presence or absence of said predetermined amplitude-modulated digital bit-pattern within the digital optical signal, further including the step of transmitting through an optical transmission delay means said duplicate signals and said polarity-inverted duplicate signals derived from said digital optical signal, and;

deriving said optical detection signal from a combination of said duplicate signals and said polarity-inverted duplicate signals output of said optical delay means, wherein said duplicate signals and said polarity-inverted duplicate signals are each conveyed via optical radiation of a wavelength different from that of the radiation conveying any of the other signal duplicates, and wherein respective ones of said duplicate signals and said polarity-inverted duplicate signals are transmitted through respective individual ones of a plurality of separate optical transmission delay means, wherein;

said optical detection signal is derived from a combination of the delayed duplicate signals and the delayed polarity-inverted duplicate signals output of said optical delay means.

\* \* \* \* \*